Nov. 15, 1949  H. J. RATHBUN  2,488,238
CONTROL SYSTEM FOR HOISTS POWERED BY POLYPHASE
INDUCTION MOTOR AND COUPLED
TO A BRAKING GENERATOR
Filed Nov. 30, 1948
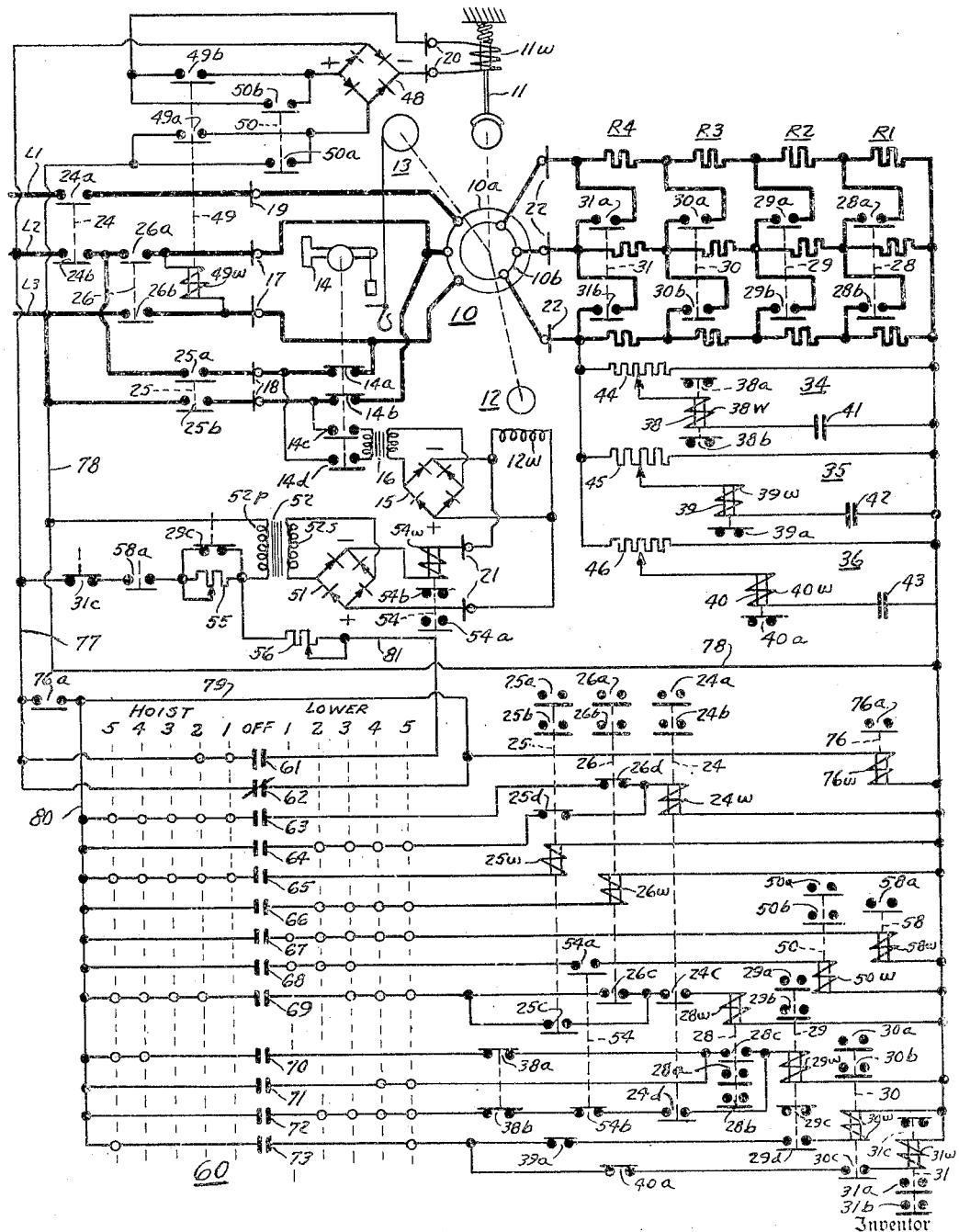
Inventor
HAROLD J. RATHBUN
his Attorneys Patented Nov. 15, 1949

2,488,238

UNITED STATES PATENT OFFICE 2,488,238

CONTROL SYSTEM FOR HOISTS POWERED BY POLYPHASE INDUCTION MOTOR AND COUPLED TO A BRAKING GENERATOR

Harold J. Rathbun, Cleveland, Ohio, assignor to The Electric Controller & Manufacturing Company, Cleveland, Ohio, a corporation of Ohio Application November 30, 1948, Serial No. 62,772

11 Claims. (Cl. 318—203)

This invention relates to systems of control for motor drives in which a polyphase wound rotor induction motor coupled to an artificial load is utilized for apparatus in which the actual load at times overhauls and drives the motor and its artificial load and in which the overhauling load must be retarded to limit its speed. The invention is particularly applicable to hoist applications and is hereinafter described as applied to that use.

Braking generators have been used as artificial loads for wound rotor induction motors driving the hoist motion of cranes to give under-synchronous speed control during hoisting as well as during both power and over-hauling lowering. When used for speed control, generators of the eddy current type, commonly referred to as "eddy current brakes," possess some advantages, such as simplicity and cost, over D.-C. shunt, series, or compound generators having external load circuits and over D.-C. excited squirrel cage machines.

Until recently, eddy current brakes were of limited advantage in hoist applications because of the pronounced decrease in torque with speed after reaching a predetermined maximum torque, as evidenced by the so-called drooping speed-torque characteristics. Recent improvements in the design of eddy current generators or brakes, such as disclosed in United States Letters Patent Nos. 2,106,542, 2,197,990, and 2,220,007, have eliminated the need of auxiliary equipment for preventing the torque of the eddy current brake from decreasing at high speeds. If overexcited, these improved brakes also are capable of producing for short time periods braking torques greatly in excess of their normal ratings.

It is common practice in control systems for alternating current cranes to provide a power circuit limit switch to protect against overhoisting. The overhoist limit switch is generally of the type operated by a trip member on the hook block. A pair of normally closed contacts of the limit switch is interposed in two of the primary leads to the motor and the contacts are opened to deenergize the motor when the crane hook reaches a predetermined elevated position. The spring-applied, electromagnetically-released friction brake associated with the motor is also arranged to be deenergized when the limit switch operates. Power circuit limit switches of this type have been standardized for D.-C. crane service where dynamic braking is provided and consequently have two normally-open contacts which close upon opening of the normally-closed contacts. When these standard limit switches heretofore have been provided on A.-C. cranes, the two normally-open contacts have not been used.

The two heretofore unused limit switch contacts are utilized in accordance with the present invention to connect the winding of an eddy current brake to the power source upon tripping of the limit switch. Advantage is taken of the ability of the improved eddy current brakes to provide a very great braking torque when overexcited by causing the eddy current brake circuit that is completed by the limit switch to provide such over-excitation.

In overhead traveling cranes the motor, friction brake, eddy current brake, and limit switch are commonly mounted on a structure such as a crane trolley which moves relatively to a bridge structure upon which the control panels, resistors, and master switches are mounted. Trolley bars and collectors are used to transmit power between the relatively moving elements of the complete crane installation. The over-excitation of the eddy current brake upon overhoisting provided by this invention is obtained without an increase in the number of trolley bars. This is accomplished by using a separate rectifier for supplying D.-C. to the eddy current brake for stopping upon overhoisting and utilizing the same trolley bars used to supply power to the motor during hoisting to supply alternating current to the separate rectifier during stopping after the overhoist limit switch operates. A further advantage of this arrangement is that a failure of one or both of the trolley bars used for supplying the over-excitation to the eddy current brake will prevent hoisting, thus rendering it unnecessary to supply overexcitation to the eddy current brake.

In control systems using braking generators or eddy current brakes for speed control during lowering, it is sometimes advantageous to provide a first lowering speed point in which the motor is deenergized and the braking generator alone is used to retard the load. Since the spring-applied, electromagnetically-released friction brake associated with the hoist drive should be electrically interlocked with the hoist motor so that it is released whenever the motor is energized, this type of control system makes it difficult to provide safe control of the friction brake. This is because in the first lowering speed point the friction brake must be released even though the motor is deenergized, whereas in at least some of the other lowering speed points the friction brake should be deenergized automatically every time the motor is deenergized. This invention provides a simple, yet foolproof, electrical interlocking system insuring that the friction brake is released in the first lowering speed point only if the eddy current brake is fully energized. The interlocking system also insures that, should the eddy current braking circuit fail during lowering beyond the first speed point, the motor secondary resistance will be reduced automatically to prevent overspeeding. In those lowering positions in which the excitation of the eddy current brake is reduced or non-existent, the improved interlocking system insures that the friction brake is deenergized in event the motor becomes deenergized. In the hoisting positions of the master switch, the operation of the friction brake depends entirely upon the energization of the hoist motor.

An object of this invention is to provide an improved alternating current hoist control system.

Another object is to provide an alternating hoist control system in which the overhoist limit switch upon interrupting the motor circuit also completes an excitation circuit for a braking generator such as an eddy current brake.

A further object is to provide an alternating current hoist control system in which an eddy current brake having a single energizing winding is used for speed control during normal hoisting and lowering operations and is also used for stopping service upon overhoisting.

A correlative object is to provide an alternating current hoist control system in which an eddy current brake is excited upon overhoisting through a circuit including trolley bars normally used to supply hoisting power to the motor.

Another correlative object is to provide an alternating current hoist control system in which the eddy current brake used for speed control during normal hoisting and lowering operations is overexcited upon overhoisting to provide a strong stopping torque.

Another object is to control the eddy current brake circuit that is completed upon overhoisting so that it will be effective for braking for an appreciable interval after return of the master switch to the off position.

Additional objects are to provide improved interlocking means between an eddy current brake supply circuit and the secondary circuit of an induction motor, to provide improved means for controlling the spring-applied friction brake in an alternating current hoist control system, to provide means insuring that the friction brake in an alternating current hoist control system is deenergized whenever the motor is deenergized except in those lowering speed points when a braking generator is at full excitation, and to provide improved interlocking means between a hoist motor and friction and eddy current brakes coupled thereto.

Other objects and advantages of this invention will become apparent from the following description wherein reference is made to the drawing which is a wiring diagram illustrating the preferred embodiment of this invention.

Referring to the drawing, a polyphase wound rotor induction motor 10 has a primary winding 10a arranged to be supplied with power from suitable supply lines L1, L2, and L3 and has a secondary winding 10b connected to a balanced wye-connected resistance bank having sections R1, R2, R3, and R4. The motor 10 is coupled in the usual manner to a spring-applied, electromagnetically-released friction brake 11 having an operating winding 11w. A suitable braking generator such as an eddy current brake 12 provided with an exciting winding 12w has its rotor coupled to the motor shaft either directly as indicated in the drawing or by means of a suitable gear train. The eddy current brake 12 should be of the type in which the braking torque produced increases continuously with speed to a predetermined maximum value and thereafter, as the speed increases, does not decrease. The motor 10 is shown as the driving means of a crane hoist mechanism 13 which is arranged to actuate a suitable power circuit type overhoist limit switch 14 having normally-closed contacts 14a and 14b and normally-open contacts 14c and 14d. When the hook of the hoist mechanism reaches a predetermined elevated position, the limit switch 14 operates to open the contacts 14a and 14b and to close the contacts 14c and 14d and when the hook is lowered from its overhoisted position the limit switch 14 returns to its normal position.

The motor 10, the friction brake 11, the eddy current brake 12, the hoist mechanism 13, the limit switch 14, a rectifier 15, and a transformer 16 are arranged to be mounted on a unitary structure such as a crane trolley (not shown) capable of moving relative to the remainder of the equipment shown in the drawing. Power connections are completed between the relatively moving parts of the control system by means of a plurality of trolley bars and associated trolley wheels. A pair of trolley bars 17 are used during lowering operations to complete power connections to the primary winding 10a, and a pair of trolley bars 18 are similarly used during hoisting operations, a trolley bar 19 being used for primary motor connections during both hoisting and lowering. The friction brake 11 is supplied through a pair of trolley bars 20, and the eddy current brake 12 is supplied during normal hoisting and lowering operations through a pair of trolley bars 21. The secondary winding 10b is connected to the secondary resistor bank through three trolley bars 22.

The control system illustrated comprises a plurality of electromagnetic contactors and relays, each of which is diagrammatically shown on the drawing. To simplify the drawing, many of the contactor and relay contacts are shown in convenient physical locations in the wiring diagram for illustrating their switching function and are also shown in conjunction with their respective operating windings to illustrate how they are operated.

Power connections for causing the motor 10 to operate in the hoisting direction are completed upon closure of electromagnetic contactors 24 and 25. The contactor 24 has normally-open main contacts 24a and 24b and normally-open auxiliary contacts 24c and 24d. The contactor 25 has normally-open main contacts 25a and 25b, normally-open auxiliary contacts 25c, and normally-closed auxiliary contacts 25d.

Power connections for causing the motor 10 to operate in the lowering direction are completed upon closure of the contactor 24 and an electromagnetic contactor 26. The contactor 26 has normally-open main contacts 26a and 26b, normally-open auxiliary contacts 26c, and normally-closed auxiliary contacts 26d. The contactors 24, 25, and 26 have operating windings 24w, 25w, and 26w, respectively.

Control of the secondary circuit of the motor may be provided by a plurality of electromagnetic contactors 28, 29, 30, and 31 each having normally-open main contacts, indicated by the reference numeral of the respective contactor followed by the letters a and b, for selectively short circuiting the resistance sections R1, R2, R3, and R4. The contactors 28, 29, 30, and 31 have operating windings 28w, 29w, 30w, and 31w, respectively. The contactor 28 has normally-open auxiliary contacts 28c, the contactor 29 has normally-closed auxiliary contacts 29c and normally-open auxiliary contacts 29d, the contactor 30 has normally open auxiliary contacts 30c, and the contactor 31 has normally-closed auxiliary contacts 31c. The secondary circuit may also include a plurality of speed-responsive, acceleration-controlling relay circuits 34, 35, and 36, each of which obtains its operating voltage from the secondary winding 10b. The relay circuits 34, 35, 36 are frequency responsive and their application in controlling the acceleration of an induction motor is described and claimed in Leitch Patent No. 2,165,491, hence only a brief description of these relay circuits is included herein.

The relay circuits 34, 35, and 36 include electromagnetic relays 38, 39, and 40 which have their respective operating windings 38w, 39w, and 40w connected in series with condensers 41, 42, and 43, respectively. The relay 38 has a pair of normally-closed contacts 38a and 38b, and the relays 39 and 40 have normally-closed contacts 39a and 40a, respectively. Ability to adjust the operating voltage and frequency of the relay circuits 34, 35, and 36 is provided by use of a plurality of potentiometer resistors 44, 45, and 46. The frequency responsive circuits comprising the series connected condensers and relay windings are so adjusted that current of operating magnitude flows through the windings whenever the frequency of the current in the secondary winding 10b corresponds to the frequency of the source supplying the primary winding 10a. As the secondary frequency decreases during acceleration, the relays 38, 39, and 40 drop out in sequence to control the contactors 29, 30, and 31 in a manner to be described.

The brake winding 11w is supplied from the direct current side of a rectifier 48 having its alternating current terminals arranged to be connected across the supply lines L2 and L3. A brake relay 49 having its operating winding 49w connected across the two of the primary motor terminals supplied from the lines L2 and L3 has normally-open contacts 49a in the circuit to the A.-C. side of the rectifier 48 and normally open contacts 49b in the circuit to the D.-C. side of the rectifier 48. A second electromagnetic brake controlling relay 50 having an operating winding 50w has normally-open contacts 50a and 50b connected in parallel with the contacts 49a and 49b, respectively.

The winding 12w of the eddy current brake is supplied during normal operation of the hoist from a rectifier 51 having its alternating current terminals connected across a secondary winding 52s of a transformer 52 having a primary winding 52p. The primary winding 52p is arranged to be energized from the power supply lines L2 and L3. The direct current supply circuit for the winding 12w of the eddy current brake 12 includes the trolley bars 21 and on operating winding 54w of an interlock relay 54 having normally-closed contacts 54b and normally-open contacts 54a. A pair of adjustable resistors 55 and 56 are included in the supply circuit to the winding 52p which is controlled by the normally-closed auxiliary contacts 29c and 31c of the contactors 29 and 31, respectively, normally-open contacts 58a of a time delay relay 58 having an operating winding 58w, and a contact 61 of a master switch 60 also having contacts 62 through 73.

The contacts 62 are closed in the off position of the master switch 60 while all of the other master switch contacts are open in the off position. When the master switch 60 is operated in either the hoisting or lowering direction its contacts are open except as closure thereof is indicated by the small circles in horizontal alignment of the contacts, each circle indicating that its horizontally aligned contacts are closed for the respective position of the master switch. Thus, for example, the contacts 65 are closed in all hoisting positions but are open in the off as well as in all lowering positions.

Upon overhoisting, the crane mechanism 13 effects opening of the contacts 14a and 14b and closure of the contacts 14c and 14d of the limit switch 14. Opening of the contacts 14a and 14b causes deenergization of the motor 10 and closure of the contacts 14c and 14d completes a circuit from the supply lines L2 and L3 through the contacts 25a and 25b, the trolley bars 18, the transformer 16, and the rectifier 15 to the eddy current brake winding 12w. A suitable adjustable resistor (not shown) may be included in this circuit to adjust the voltage impressed on the winding 12w if desired. The rectifier 15 and transformer 16 are mounted on the trolley structure and are connected directly to the winding 12w.

An undervoltage relay 76 having an operating winding 76w and normally-open contacts 76a is arranged to be operated by the master switch 60 in the usual manner. Suitable overload relays (not shown) may have their normally closed contacts in the operating circuit for the relay 76 as is usual in the art.

Additional structural details of the invention will become apparent from the following description of the operation of the illustrated embodiment.

With proper voltage applied to the supply lines L1, L2, and L3 and the master switch 60 in the off position, an energizing circuit is completed to the winding 76w of the under-voltage relay 76 from the supply line L2 through a conductor 77, the contacts 62, the winding 76w, and a conductor 78 to the supply line L3. Closure of the contacts 76a of the relay 76 completes a holding circuit for the relay 76 through a conductor 79 and connects a conductor 80 to the supply line L2.

Movement of the master switch 60 to the first hoisting position opens the contacts 62 and closes the contacts 61, 63, and 65. Closure of the contacts 65 completes an energizing circuit for the winding 25w of the contactor 25, and closure of the contacts 63 completes an energizing circuit for the winding 24w of the contactor 24. The circuit to the winding 24w includes the normally-closed contacts 26d of the contactor 26. In response to the energization of their operating windings 24w and 25w, the contactors 24 and 25 close their main contacts to energize the primary winding 10a so as to cause the motor 10 to exert a torque in the hoisting direction.

Upon closure of the main contacts 25a and 25b of the contactor 25 and the main contacts 24b of the contactor 24, the winding 49w is energized to cause the relay 49 to complete an energizing circuit to the winding 11w of the friction brake 11 which thereupon releases.

As soon as the contactors 24 and 25 close, the relays 38, 39, and 40 pick up to open their normally-closed contacts.

Closure of the contacts 61 completes a circuit from the supply line L2 through the conductor 77 and a conductor 81, the resistor 56, the primary winding 52p, and the conductor 78 to the supply line L3. The eddy current brake 12 is thereupon energized over the previously described circuit including the rectifier 51. The resistor 56 is so adjusted that the eddy current brake 12 adds load to the motor 10 sufficient to give a suitable slow-speed hoisting characteristic. Preferably, the value of this excitation is somewhat below the normal crane-rated excitation of the brake 12.

Increased hoisting speed of the motor 10 is obtained upon movement of the master switch 60 to the second hoisting position wherein the contacts 69 are closed to complete an energizing circuit through the now closed contacts 24c and 25c to the winding 28w of the contactor 28 which responds to short circuit the resistor section R1.

Upon movement of the master switch 60 to the third hoisting position, the contacts 61 open to effect deenergization of the eddy current brake 12 resulting in a further increase in hoisting speed.

In the fourth hoisting position of the master switch 60 the contacts 70 are closed. When the motor 10 reaches a speed causing drop out of the relay 38, an energizing circuit for the winding 29w is completed through the contacts 70, 38a, and 28c. Response of the contactor 29 to energization of its winding 29w short circuits the additional resistor section R2.

In the last hoisting position, the contacts 73 close to set up crcuits for the windings 30w and 31w. As soon as the motor speed reaches a value causing the relay 39 to drop out, the contacts 39a close to complete the circuit for the winding 30w through the now closed contacts 29d of the contactor 29, and upon a further increase in speed the relay 40 drops out to close its contacts 40a completing a circuit to the winding 31w through the now closed contacts 30c of the contactor 30. The contactors 30 and 31 thus close in sequence to short circuit the additional resistor sections R3 and R4, respectively.

Upon movement of the master switch 60 to the first lowering position the contacts 67 close to complete an energizing circuit for the winding 58w of the time delay relay 58 and the relay 58 closes its contacts 58a immediately to complete an energizing circuit for the primary winding 52p causing energization of the eddy current brake 12. The circuit to the winding 52p includes the normally-closed contacts 31c and 29c and preferably the brake 12 is energized at its normal crane-service rating. The relay 54 in the direct current supply circuit to the eddy current brake 12 is thereupon operated to close its contacts 54a which complete a circuit through the master switch contacts 68 to the winding 50w of the relay 50 which thereupon operates to close contacts 50a and 50b to effect release of the brake 11. Overhauling loads now descend and their speed is limited by the brake 12.

In the second lowering position of the master switch 60, the windings 24w and 26w are energized through the contacts 64 and 66, respectively, and the contactors 24 and 26 close their main contacts in the primary circuit of the winding 10a to cause the motor to exert a lowering torque. As soon as power is applied to the primary winding 10a, the relays 38, 39, and 40 move to their operated positions. Closure of the contacts 24b, 26a, and 26b affects energization of the winding 49w of the relay 49 which closes its contacts 49a and 49b. The relay 50 remains energized provided the eddy current brake is still energized. Also in the second lowering position the contacts 72 are closed. If, for any reason, the D.-C. circuit to the eddy current brake 12 should cease to carry current, the relay 54 drops out and opens its contacts 54a and closes its contacts 54b. Opening of the contacts 54a causes drop out of the relay 50, but the brake 11 remains energized because of the closed relay 49. However, if the motor speed should reach a value causing drop out of the relay 38, the contactor 29 operates as a result of the energization of its winding 29w to short circuit the resistor sections R1 and R2 to insure a safe lowering speed. This emergency circuit to the winding 29w of the contactor 29 includes the contacts 72, 38b, 54b, and 24d.

In the third lowering position of the master switch 60, the contacts 69 close to complete an energizing circuit for the winding 28w from the conductor 80 through the contacts 69, 26c, 24c, and the winding 28w to the conductor 78. Closure of the contactor 28 in response to energization of its winding 28w short circuits the resistor section R1 to effect an increased lowering speed. While the master switch is in the third position, the previously described over-speed protective circuit through the contacts 72 remains potentially operative.

In the fourth lowering position the contacts 68 open to deenergize the winding 50w of the relay 50 which thereupon opens its contacts 50a and 50b so that the energization of the friction brake winding 11w depends entirely upon the energization of the winding 49w of the relay 49. Also, in the fourth lowering position, the contacts 71 close to complete an energizing circuit through the contacts 28c to the winding 29w. In response to the energization of its operating winding 29w, the contactor 29 operates to short circuit the additional resistor section R2 and opens its contacts 29c to insert the resistor 55 into the supply circuit to the primary winding 52p. The eddy current brake excitation is consequently reduced and loads are lowered at an increased lowering speed.

In the last lowering position the contacts 73 are closed and an operating circuit for the windings 30w and 31w is partially completed. The circuit to the winding 30w is completed when the motor speed reaches a value causing drop-out of the relay 39, and the circuit to the winding 31w is completed upon a further increase in motor speed causing a drop-out of the relay 40. The contactors 30 and 31 operate in sequence to short circuit the additional resistor sections R3 and R4. Operation of the contactor 31 also causes opening of its contacts 31c which disconnects the primary winding 52p from the source thereby causing the eddy current brake 12 to be completely deenergized. Overhauling loads are now retarded by the regenerative action of the motor 10 alone.

Upon return of the master switch 60 to its off position from any lowering position, all of the contactors and relays controlled thereby are deenergized except the relay 76. The motor 10 is disconnected from the supply leads and the friction brake 11 is deenergized. The relay 58, however, maintains its contacts 58a in the closed position for a predetermined time to cause the eddy current brake to remain excited until the load comes to rest. Thus when the master switch 60 is moved to the off position to stop a descending load, the eddy current brake 12 assists the friction brake 11 until the load stops.

If, while the hoist mechanism 13 is being operated to hoist a load, the load should exceed a predetermined height, the over-hoist limit switch 14 is actuated so that its contacts 14a and 14b open and its contacts 14c and 14d close. Opening of the contacts 14a and 14b disconnects two primary terminals of the motor 10 from the supply lines and the motor 10 is deenergized. Concurrently, the relay 49 is deenergized and opens its contacts 49a and 49b to permit the spring-applied friction brake 11 to set. Closure of the contacts 14c and 14d completes a circuit through the contacts 25a and 25b, the trolley bars 18, the transformer 16, and the rectifier 15 to the winding 12w of the eddy current brake 12. The output voltage of the transformer 16 is so selected that so long as the contacts 25a and 25b remain closed, the eddy current brake is over-excited and exerts a very large torque tending to stop the load. When the master switch is returned from any of the hoist positions to the off position, the contacts 25a and 25b open and the A.-C. supply to eddy current brake is interrupted. However, it is to be noted that the energizing circuit for the eddy current brake constitutes a closed loop through the rectifier 15 and consequently the current in this loop does not fall to zero instantaneously upon opening of the contactor 25 as would be the case if the switch controlling the brake circuit were in the loop. Since the eddy current brake is over-excited when the contacts 14c and 14d close, the brake 12 continues to exert a very large braking torque for a short interval after the master switch is returned to the off position.

Although this invention has been described in connection with an eddy current braking hoist controller in which the motor is deenergized in a lowering speed point and the eddy current brake is used alone for retarding overhauling loads, it is obvious that many of the advantages of this invention may be obtained if the control system herein described is applied to the eddy current braking hoist controller described in a co-pending patent application of John D. Leitch, Serial No. 39,604, filed July 20, 1948, and utilizing A.-C. dynamic braking for the slowest lowering speed.

Having thus described my invention, I claim:

1. A control system for hoists powered by a polyphase induction motor arranged to drive loads and to be driven by descending loads, selectively, and coupled to a braking generator having a flux producing winding, said control system comprising reversing means operable to connect the motor to a source of power for causing the motor to hoist said loads and to drive said loads downwardly, selectively, limit switch means including contacts rendered operative upon hoisting of said loads beyond a predetermined limit to open and thereby disconnect said motor from the source of power irrespective of said reversing means, said limit switch means including additional contacts rendered operative upon disconnection of said motor by said limit switch to complete an operating circuit for said braking generator to cause braking action by said generator.

2. The control system of claim 1 characterized in that means are provided for connecting said flux producing winding in a permanently closed loop circuit with a rectifier poled to cause a slow decay of flux in said circuit when external power is removed therefrom.

3. A control system for hoists powered by a polyphase induction motor arranged to drive loads and to be driven by descending loads, selectively, and coupled to a braking generator, said control system comprising reversing means operable to connect the motor to a source of power for causing the motor to hoist said loads and to drive said loads downwardly, selectively, means operative for energizing said generator at reduced excitation while said reversing means is operative to cause the torque of said generator to oppose the torque of said motor, limit switch means including contacts rendered operative upon hoisting of said loads beyond a predetermined limit to disconnect said motor from the source of power irrespective of said reversing means, and said limit switch means including additional contacts operative upon disconnection of said motor by said limit switch to complete a circuit for increasing the energization of said braking generator.

4. In a wound rotor induction motor and hoist control system combination, a plurality of trolley bar mechanisms, control means for said motor connected between said trolley bar mechanisms and a source of power for the motor, a braking generator coupled to the motor and normally supplied from said source through additional trolley bar mechanisms, an overhoist limit switch arranged to disconnect said motor from said source and concurrently to connect said braking generator to said source through some of said first trolley bar mechanisms.

5. The combination of claim 4 characterized in that said some of said first trolley bar mechanisms include some of those used to supply power for causing said motor to operate in the hoisting direction.

6. In a hoist control system for a wound rotor induction motor coupled to a braking generator, an electromagnetically operated friction brake for the motor releasable to permit operation of the motor and settable to prevent said operation, a first relay means responsive to energization of the motor for effecting release of the friction brake and responsive to deenergization of the motor for effecting setting of the friction brake, and a second relay means responsive to energization of the braking generator for effecting release of the friction brake when the motor is not energized and responsive to deenergization of the braking generator for effecting setting of the friction brake when the motor is not energized.

7. The hoist control system of claim 6 characterized in that manually operated control means are provided and include contact means preventing operation of said second relay when said motor is operating in the hoisting direction.

8. In a hoist control system including a wound rotor induction motor, a braking generator coupled thereto, an electromagnetically operated friction brake for the motor releasable to permit operation of the motor and settable to prevent said operation, a first relay means responsive to energization of the motor for effecting release of the friction brake and responsive to deenergization of the motor for effecting setting of the friction brake, speed limiting means for the motor normally inoperative when the braking generator is energized, a second relay means responsive to energization of the braking generator for effecting release of the friction brake when the motor is not energized and responsive to deenergization of the braking generator for effecting setting of the friction brake when the motor is not energized, and said second relay means including means rendering said speed limiting means operative upon deenergization of said braking generator.

9. In a hoist control system for a wound rotor induction motor subject to overhauling descending loads, a braking generator having a field winding and arranged to be mechanically coupled to the motor for driving thereby when the motor is driven by the descending loads, an energizing circuit for said field winding, an electromagnetically operated friction brake for the motor releasable to permit rotation of the motor and settable to prevent said rotation, a first relay means responsive to energization of the motor for effecting release of said friction brake and to the deenergization of the motor for effecting setting of said friction brake, and a second relay means responsive to energization of said field winding for effecting release of said friction brake when the motor is not energized and responsive to deenergization of said field winding for effecting setting of said friction brake when the motor is not energized, and said second relay means including an operating winding interposed in said energizing circuit in series with said field winding.

10. A hoist control system comprising reversing means adapted to be combined with a polyphase induction motor having primary and secondary windings and arranged to drive loads and to be driven by descending loads, selectively, and coupled to a braking generator having a field winding and when so combined operable to connect said primary winding to a source of power to cause said motor to hoist said loads and to drive said loads downwardly, selectively, a generator control means adapted to be combined with said generator and when so combined operable to connect said field winding in a generator supply circuit to render said generator operative and inoperative, selectively, while said primary winding is connected to said source of power and while said primary winding is not connected to said source of power, an electromagnetically operated friction brake for said load, a first brake releasing means rendered operative upon connection of said primary winding to said source of power to release said brake thereby permitting said motor to drive said load or be driven by said load, an electromagnetic relay having its operating winding interposed in said generator supply circuit, and a second brake releasing means rendered operative upon energization of said operating winding upon connection of said generator field winding to said generator supply circuit to release said brake when said primary winding is disconnected from said source and said first brake releasing means is inoperative.

11. In a wound rotor motor and hoist control system combination, a polyphase wound rotor induction motor arranged to drive loads and to be driven by descending loads, selectively, a braking generator mechanically coupled to said motor for driving thereby and by said descending loads, reversing means operable to connect said motor to a source of power for causing said motor to hoist said loads or to drive said loads downwardly, selectively, circuit means operative for energizing said generator from the source of power at reduced value while said reversing means is operative to cause the torque of said generator to oppose the torque of said motor, limit switch means including contacts rendered operative upon hoisting of said loads beyond a predetermined limit to disconnect said motor from the source of power irrespective of said reversing means, and said limit switch means including additional contacts operative upon disconnection of said motor by said limit switch to complete a circuit for increasing the energization of said braking generator from said source.

HAROLD J. RATHBUN.

REFERENCES CITED

The following references are of record in the file of this patent:

UNITED STATES PATENTS

| Number | Name | Date |
|---|---|---|
| 1,267,820 | Stevens | May 28, 1918 |